(12) United States Patent
Shyu et al.

(10) Patent No.: US 8,040,623 B2
(45) Date of Patent: Oct. 18, 2011

(54) COMPACT AUTO FOCUS LENS MODULE WITH PIEZOELECTRIC ACTUATOR

(75) Inventors: San-Woei Shyu, Taipei (TW); Chin-Yi Chou, Taipei (TW); Teng-Chien Yu, Taipei (TW)

(73) Assignee: E-Pin International Tech Co., Ltd., Taipei (TW)

( * ) Notice: Subject to any disclaimer, the term of this patent is extended or adjusted under 35 U.S.C. 154(b) by 0 days.

(21) Appl. No.: 12/845,101

(22) Filed: Jul. 28, 2010

(65) Prior Publication Data

US 2011/0026150 A1 Feb. 3, 2011

(30) Foreign Application Priority Data

Jul. 28, 2009 (TW) .............................. 98213834 U

(51) Int. Cl.
*G02B 7/02* (2006.01)
*G02B 15/14* (2006.01)

(52) U.S. Cl. ........ 359/824; 359/823; 359/694; 359/698; 396/75; 396/133; 310/323.02; 310/323.06; 310/328

(58) Field of Classification Search .......... 359/819–824, 359/694–698; 310/316, 317, 328, 323.01, 310/323.02, 323.17; 396/75, 85, 133; 348/208, 348/335, 357, 374; 324/207.21, 207.24; 250/201.2, 201.4
See application file for complete search history.

(56) References Cited

U.S. PATENT DOCUMENTS

| | | | | |
|---|---|---|---|---|
| 5,225,941 A | * | 7/1993 | Saito et al. | 359/824 |
| 5,644,440 A | * | 7/1997 | Akada | 359/823 |
| 5,812,330 A | * | 9/1998 | Akada | 359/823 |
| 6,111,336 A | * | 8/2000 | Yoshida et al. | 310/328 |
| 6,594,450 B1 | | 7/2003 | Kao | |
| 7,145,738 B2 | | 12/2006 | Shu | |
| 7,280,292 B2 | * | 10/2007 | Akiba et al. | 359/819 |
| 7,480,109 B1 | | 1/2009 | Hu | |
| 7,489,458 B2 | * | 2/2009 | Su et al. | 359/824 |
| 7,511,904 B2 | * | 3/2009 | Hu et al. | 359/824 |
| 7,706,089 B2 | * | 4/2010 | Koc et al. | 359/824 |
| 7,777,969 B2 | * | 8/2010 | Shirono et al. | 359/698 |
| 2007/0153404 A1 | | 7/2007 | Rouvinen | |
| 2008/0013196 A1 | | 1/2008 | Shyu | |
| 2008/0085110 A1 | | 4/2008 | Su | |
| 2008/0144201 A1 | | 6/2008 | Koc | |
| 2008/0174889 A1 | | 7/2008 | Su | |
| 2008/0231970 A1 | | 9/2008 | Henderson | |
| 2008/0246353 A1 | | 10/2008 | Kuo | |
| 2008/0297923 A1 | | 12/2008 | Koc | |
| 2009/0153987 A1 | | 6/2009 | Kim | |

FOREIGN PATENT DOCUMENTS

JP 2004020935 1/2004

(Continued)

*Primary Examiner* — Loha Ben
(74) *Attorney, Agent, or Firm* — Muncy, Geissler, Olds & Lowe, PLLC

(57) ABSTRACT

A compact auto focus lens module includes a piezoelectric actuator, an elastic element, at least two guiding fixtures, and a lens barrel with an optical lens set therein. By elastic force of the elastic element, a friction is generated between the lens barrel and the piezoelectric actuator. While being applied with a voltage, the lens barrel driven by the movement of the piezoelectric actuator moves along the optical axis under the guidance of the guiding fixtures. Due to fewer elements, compact volume, and light weight, the design is applied to a miniature auto focus lens modules so as to achieve effects of fast movement, stable focusing and reduced tilting.

5 Claims, 5 Drawing Sheets

FOREIGN PATENT DOCUMENTS

| JP | 3124292 | 7/2006 |
| JP | 3132575 | 5/2007 |
| TW | I265357 | 6/2005 |
| TW | M317027 | 3/2007 |

* cited by examiner

COMPACT AUTO FOCUS LENS MODULE WITH PIEZOELECTRIC ACTUATOR

BACKGROUND OF THE INVENTION

1. Field of the Invention

The present invention relates to a compact auto focus lens module with a piezoelectric actuator, especially to an auto focus lens module in which movement of an optical lens set is controlled by displacement and friction produced by deformation of the piezoelectric actuator for focusing.

2. Brief Discussion of the Related Art

Digital cameras or mobile phone cameras include a lens module that drives optical lens set moving along an optical axis so as to achieve autofocusing and/or zoom in/zoom out. One of the movement ways of the optical lens set is by Voice coil motor (VCM). After a current is applied to a coil, a driving force is generated in an electromagnetic field created by a permanent magnet so as to drive the optical lens set moving along the optical axis. Such design can reduce volume of lens modules so that it has been applied to mini-sized cameras, camera-equipped cellular phone or web-cameras broadly, as shown in US2008/0013196, U.S. Pat. No. 6,594,450, U.S. Pat. No. 7,145,738, TW M317027, JP3124292, JP3132575 and so on.

Ultrasonic motor (USM) is a type of electric motor formed from the ultrasonic vibration of piezoelectric material that is deformed while being applied with voltage. Then, by design of a friction drive, the ultrasonic motor moves in a rotational or straight way, as prior arts disclosed in US2009/0153987, US2008/0297923, US2008/0174889 etc. Reference is made to FIG. 1 in which, as revealed in US2008/0246353 etc., the ultrasonic motor is applied to auto focus lens module. A piezoelectric actuator 902 is disposed on the fixed element 9091 and is connected with a lens moving element 9092 by a connector 9021 for generating a piezoelectric driving force. Moreover, a coil element 907, together with a magnet element 908, generates an electric-magnetic force. By a balance between the piezoelectric driving force and the electric-magnetic force, the lens moving element 9092 and the lens set 901 are driven to move along shafts 904 for focusing.

Referring to FIG. 2 in which, as revealed in U.S. Pat. No. 7,480,109, US2008/0085110, etc., a piezoelectric drive optical lens module includes a guiding rod 904 having a frictional surface 9022, and a piezoelectric actuator 902, mounted in an elastic element 903 so as to drive the lens set 9012 as well as the lens barrel 9011 to move along a guide pin 9043 by a guide slot 9042 for focusing.

Referring to FIG. 3, another USM-type auto focus lens module revealed in US2008/0231970 includes a plate spring 903. By an elastic force from the plate spring 903 against two piezoelectric actuators 902, a friction force is generated between a guide rail 904 and a lens barrel 901. However, because the plate spring has complicated structure, high volume requirement and large space, it is not suitable for mini-sized lens modules.

In order to make the lens module move stably without tilting, devices disclosed in US2008/0144201, JP2004020935, etc., include a guide rod arranged between the lens barrel and a housing of the lens module so as to stabilize the lens barrel. In US2007/0153404, a rail is used. Referring to TW 1265357, two sets of piezoelectric actuators are arranged on edges of the lens barrel so as to make the movement thereof become stable. However, conventional ultrasonic motors for movement of the lens barrel have shortcomings of complicated structure, high cost or large volume in designs of the guiding rod or friction generation so that they are difficult to be applied to compact auto focus lens modules. Thus, there is a need to develop a driving member with highly reliable and highly stable structure that replaces conventional ways of generating friction. Moreover, requirements of simple structure, high precision, fast focus and reduced tilting need to be satisfied.

SUMMARY OF THE INVENTION

Therefore, it is a primary object of the present invention to provide a compact auto focus lens module having a piezoelectric actuator, a lens module and a frame. The piezoelectric actuator and the lens module are mounted in the frame. The lens module consists of a lens barrel fixed with an optical lens set therein, an elastic element and at least two guiding fixtures. The elastic element arranged between the lens barrel and the piezoelectric actuator includes an elastic member and a metal member. By the elastic force of the elastic element, a friction is generated on an interface between the elastic element and the piezoelectric actuator. The guiding fixture is formed by a guiding slot and a guide pin, corresponding to each other. The guiding slot is disposed on the lens barrel. The lens module slides under the guidance of the guide pin and being fixed in the frame. While being applied with a voltage, the lens barrel is driven by the piezoelectric actuator to move along the optical axis in the frame for focusing.

It is another object of the present invention to provide a compact auto focus lens module having a piezoelectric actuator with broader applications in which the elastic member is a coil spring so as to make the lens module have more applications. For further minimization of the volume, the elastic member can be an elastic pad made from elastic foam material or rubber. The elastic member can also be a leaf spring.

DETAILED DESCRIPTION OF THE PREFERRED EMBODIMENTS

Embodiment 1

Figure 1:
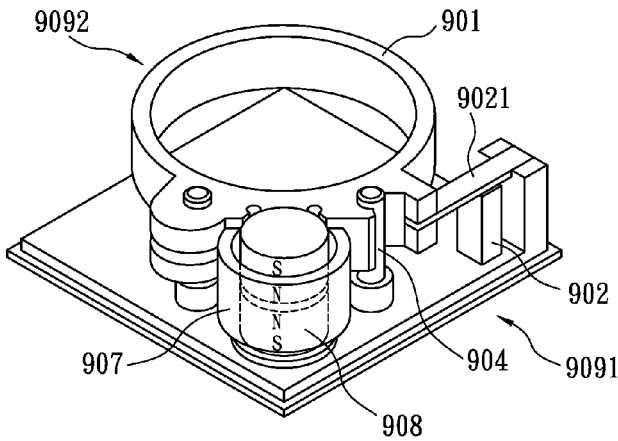
FIG. 1 is a conventional auto focus lens module with a voice coil motor and a piezoelectric actuator.
Figure 2:
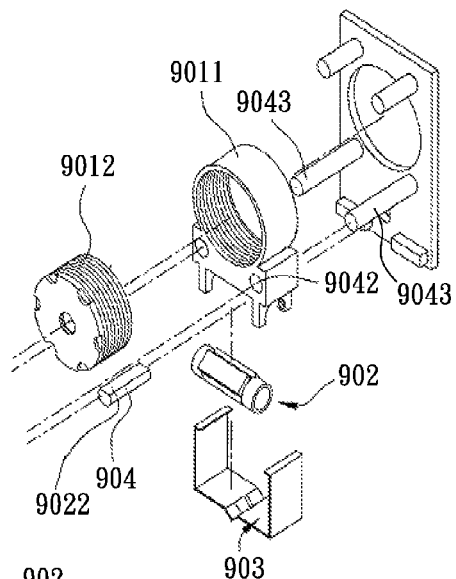
FIG. 2 is a conventional auto focus lens module with another piezoelectric actuator.
Figure 3:
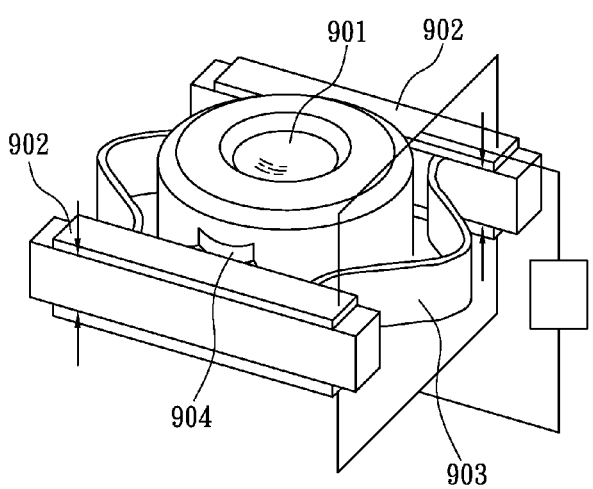
FIG. 3 is a further conventional auto focus lens module with two piezoelectric actuators.
Figure 4:
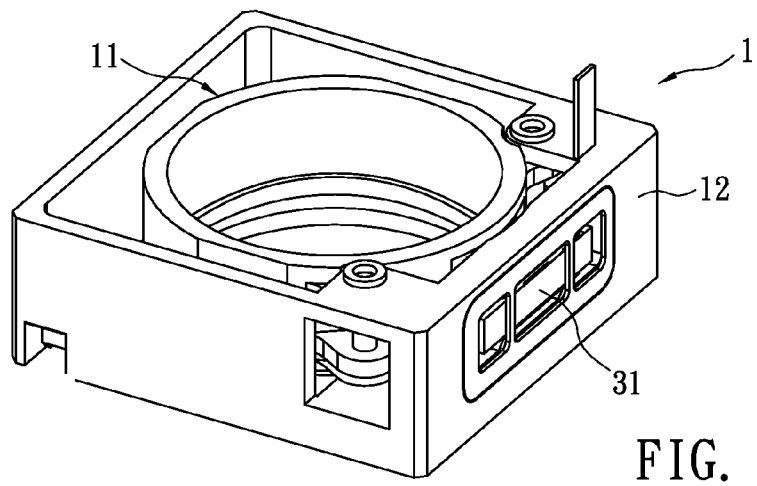
FIG. 4 is a perspective view of an embodiment according to the present invention.
Figure 5:
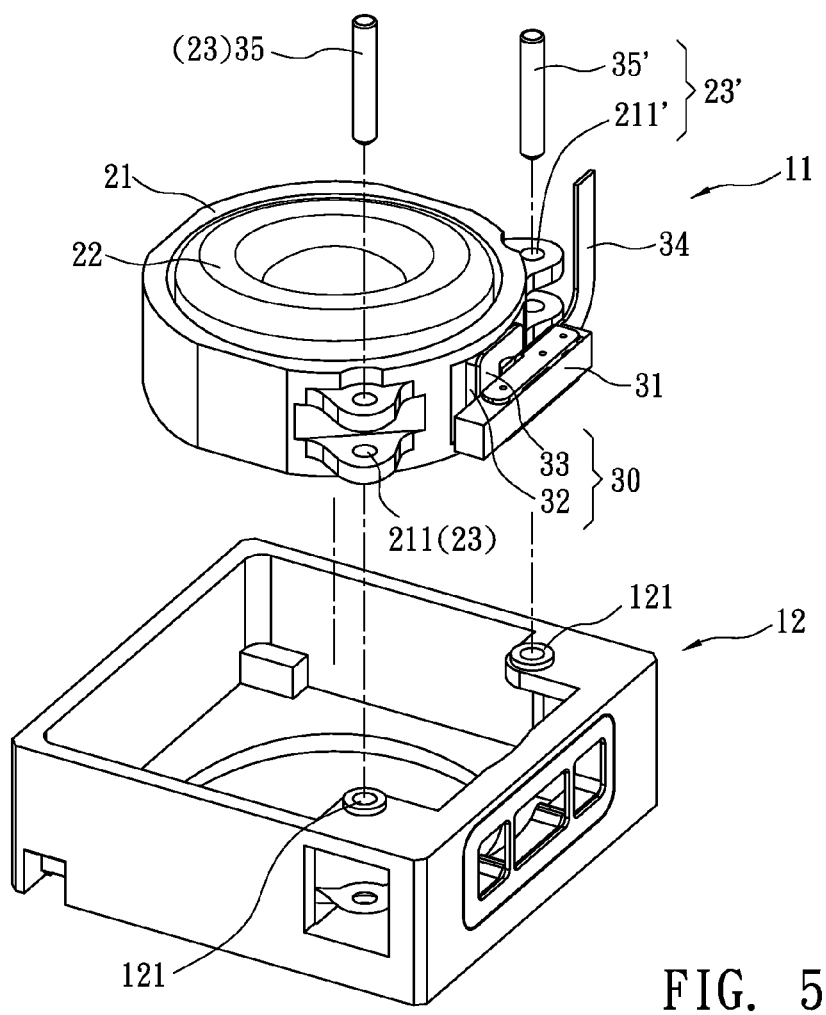
FIG. 5 is an explosive view of an embodiment according to the present invention.
Figure 6:
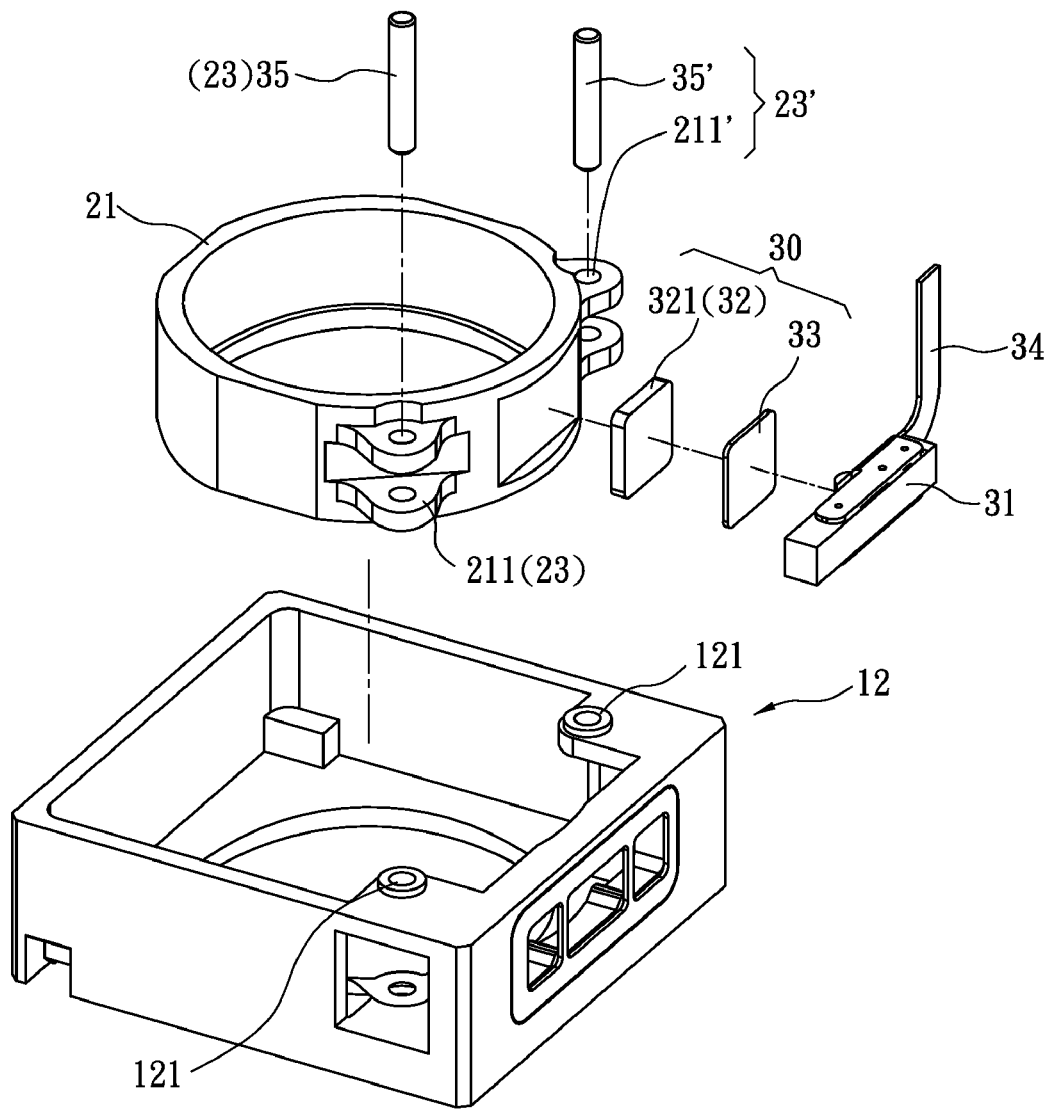
FIG. 6 is another explosive view of an embodiment according to the present invention.

Referring to FIGS. 4-6, a compact auto focus lens module having a piezoelectric actuator 1 according to the present invention includes a piezoelectric actuator 31, a lens module 11 and a frame 12. The piezoelectric actuator 31 and the lens module 11 are mounted in the frame 12. The piezoelectric actuator 31 whose electrode 34 is connected with a voltage controller (not shown in figure) is fixed in the frame 12. Generally, due to converse piezoelectric effect of piezoelectric materials, the application of an electrical field creates mechanical deformation in the materials and further leads to displacement. According to motions of piezoelectric materials, the piezoelectric actuator is classified into: (1) linear vertical motion: having single-layer type and multi-layer type, with advantages of high rigidity and large axial thrust force. (2) curved horizontal motion: including Unimorph type and Bimorph type. The piezoelectric actuator that moves in this way has larger displacement. In this embodiment, bimorph piezoelectric material with curved horizontal motion is used. When the voltage controller outputs a voltage, a resonant frequency, and a phase angle to the piezoelectric actuator 31 by the electrode 34, the piezoelectric actuator 31 waveform vibrations drive the lens module 11 to move forward or backward through friction.

The lens module 11 consists of a lens barrel 21, an optical lens set 22, an elastic element 30 and two guiding fixtures 23, 23'. The optical lens set 22 is fixed in the lens barrel 21 and has at least one optical lens for concentrating light on an image sensor (not shown in figure). For the auto focus lens module 11, the lens barrel 21 moves along an optical axis and the optical lens set 22 also moves along with the movement of the lens barrel 21 so that the distance between the optical lens set 22 and the image sensor varies to have different imaging effects. However, the lens barrel 21 needs stability, without tilt for optimal imaging effects. This embodiment includes two guiding fixtures 23, 23', respectively having corresponding guiding slots 211/211' and guide pins 35/35'. The guiding slots 211/211' are arranged at the lens barrel 21. By the guide pins 35/35' that connects the guiding slots 211/211' of the lens barrel 21 with a fixing ring 121 of the frame 12, the lens barrel 22 is set movably in the frame 12. Thus the lens module 11 can move vertically along the guide pins 35/35' in the frame 12.

The elastic element 30 is disposed between the lens barrel 21 and the piezoelectric actuator 31. By such arrangement, the auto focus lens module 1 becomes more compact and the shortcoming of a conventional lens module with larger volume caused by plate springs around the lens barrel can be avoided. In the embodiment, the elastic element 30 is formed by an elastic member 32 and a metal member 33. The elastic member 32 can be a pad made from elastic rubber or foam material that generates an elastic force. As shown in FIG. 6, the elastic member 32 is an elastic pad 321 made from ethylene-propylene rubber (EPDM), but is not limited to this material. One end of the elastic pad 321 is glued on one side of the lens barrel 21 which is designed into a flat surface for convenience of adhesion. The other end of the elastic pad 321 is glued on the metal member 33 so that the metal member 33 presses against the piezoelectric actuator 31 by the elastic force of the elastic pad 321. A friction is generated on an interface between the metal member 33 and the piezoelectric actuator 31. The voltage controller outputs the voltage, the resonant frequency, and the phase angle to the piezoelectric actuator 31 by the electrode 34 so as to generate waveform vibrations and transmit the vibrations to the lens barrel 21 through the friction. In other words, by the movement of the piezoelectric actuator 31, the lens barrel 21 moves along the optical axis under the guidance of the guiding fixtures 23, 23' for preventing tilting within the frame 12. Thus, the focusing is achieved by moving forward or backward of the lens barrel 21 in line.

Compared with conventional lens modules, the above design makes the lens module 11 moves stably and rapidly while the tilting of the lens module 11 is reduced. Moreover, the auto focus lens module 1 is minimized so as to be used in miniature optical systems.

Embodiment 2

Figure 7:
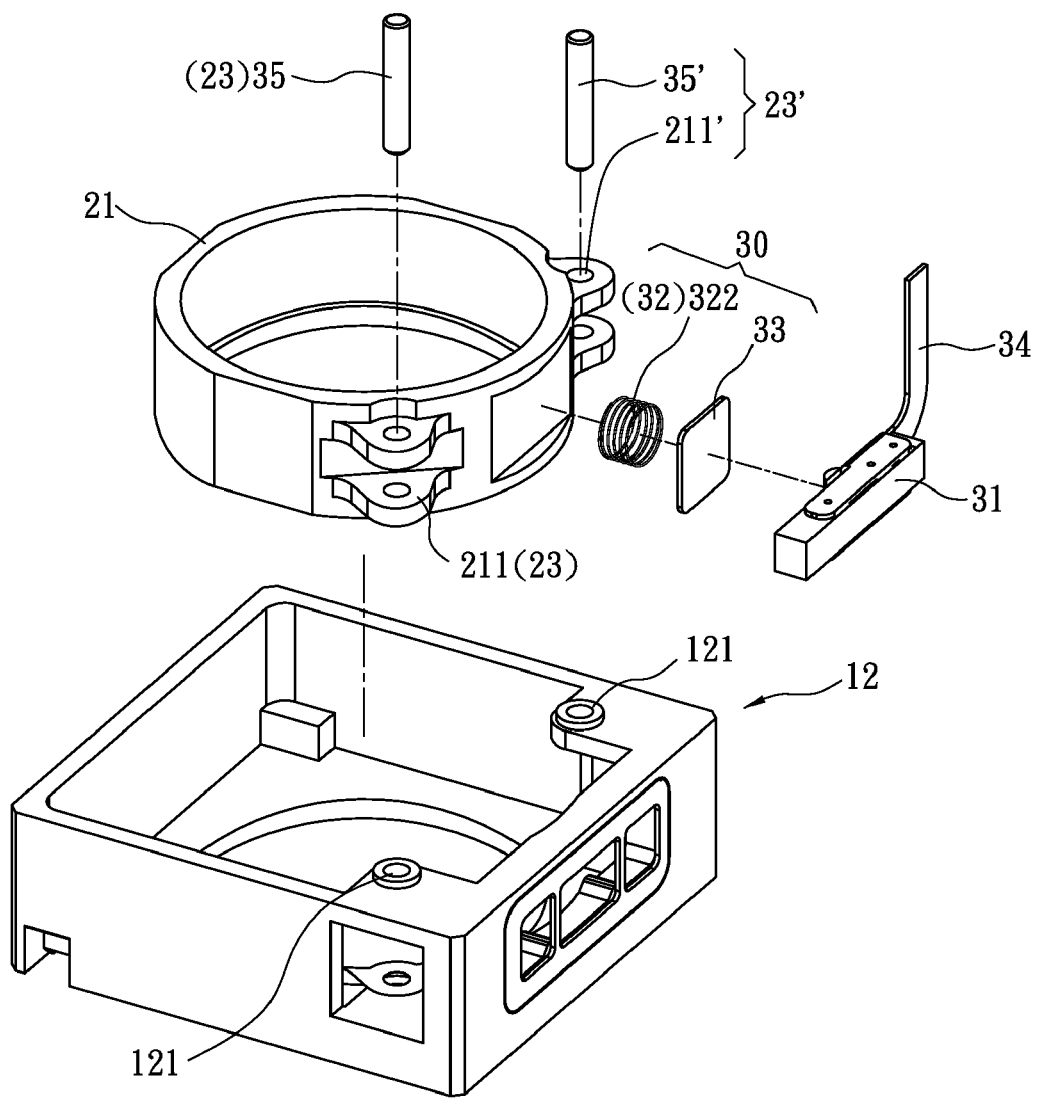
FIG. 7 is an explosive view of another embodiment according to the present invention.

Referring to FIG. 4 and FIG. 7, this embodiment has similar structure with the above embodiment but the elastic member 32 of the elastic element 30 is a coil spring 322. One end of the coil spring 322 is fixed on one side of the lens barrel 21 while the other end thereof is glued on a metal member 33. By the spring tension of the coil spring 322, the metal member 33 presses against the piezoelectric actuator 31 so as to generate a friction on an interface between the metal member 33 and the piezoelectric actuator 31.

Embodiment 3

Figure 8:
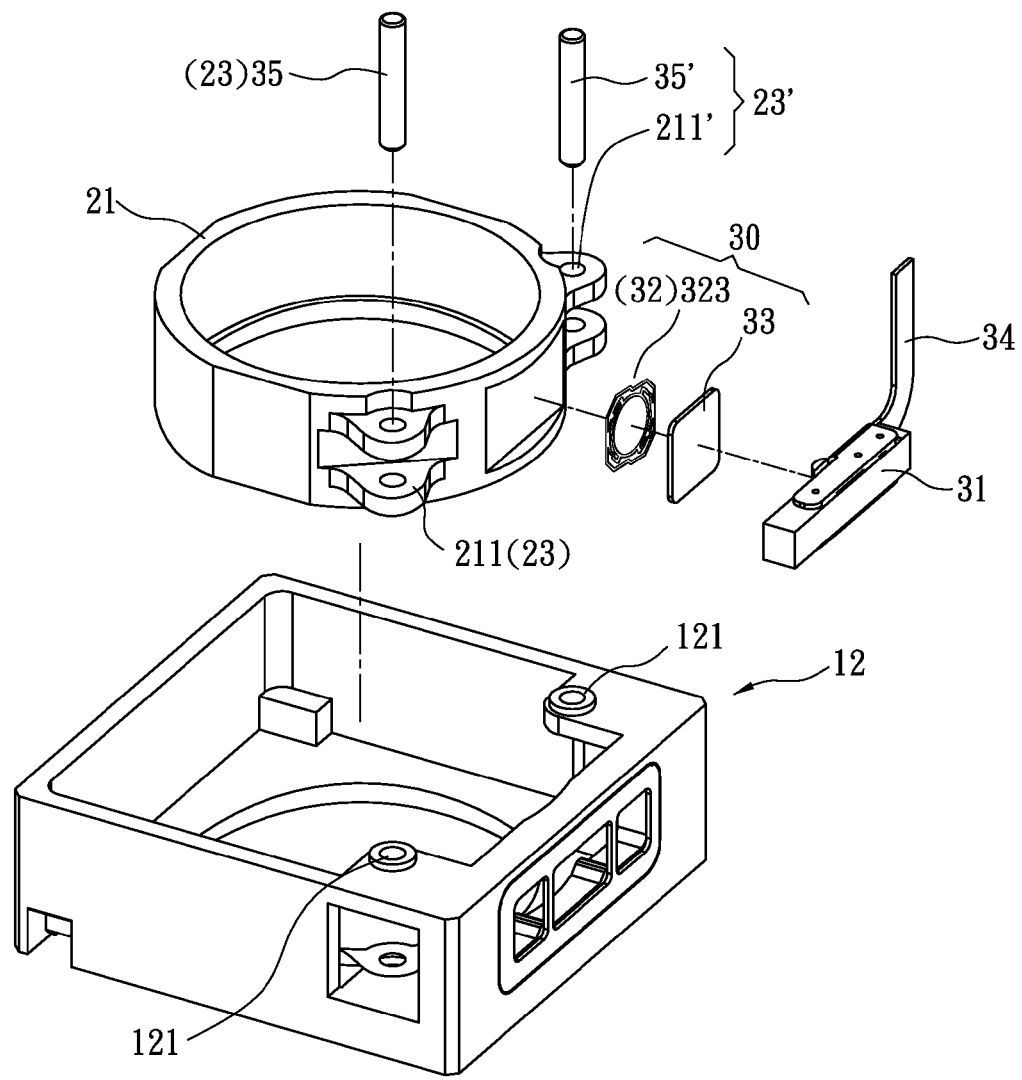
FIG. 8 is an explosive view of a further embodiment according to the present invention.

Referring to FIG. 4 and FIG. 8, this embodiment has similar structure with the above embodiment but the elastic member 32 of the elastic element 30 is a leaf spring 323. One end of the leaf spring 323 is fixed on one side of the lens barrel 21 while the other end thereof is glued on a metal member 33. By the recovery force of the leaf spring 323, the metal member 33 presses against the piezoelectric actuator 31 so as to generate a friction on an interface between the metal member 33 and the piezoelectric actuator 31.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A compact auto focus lens module having a piezoelectric actuator, comprising:
   a frame;
   a piezoelectric actuator disposed in the frame for generating vibrations; and
   a lens module disposed in the frame, comprising:
      a lens barrel;
      an optical lens set disposed in the lens barrel;
      an elastic element arranged between the lens barrel and the piezoelectric actuator, comprising an elastic member and a metal member, wherein the elastic member is fixed to and arranged between the metal member and the lens barrel to press the metal member to the piezoelectric actuator so that the piezoelectric actuator contacts the metal member; and
      two guiding fixtures configured to slidably fix the lens barrel to the frame so that the lens module moves vertically along an optical axis in the frame;
   wherein, while applying voltage to the piezoelectric actuator to generate the vibrations, the lens barrel is driven by the friction between the piezoelectric actuator and the metal member, and moves along the optical axis.

2. The compact auto focus lens module as claimed in claim 1, wherein each guiding fixture further comprises a guiding slot and a corresponding guide pin, the guiding slot being disposed at the lens barrel, the lens barrel being slidably fixed to the frame by the guide pin so that the lens module moves vertically along the guide pin and the optical axis.

3. The compact auto focus lens module as claimed in claim 1, wherein the elastic member of the elastic element is an elastic pad made from rubber or foam.

4. The compact auto focus lens module as claimed in claim 1, wherein the elastic member of the elastic element is a coil spring or a leaf spring.

5. The compact auto focus lens module as claimed in claim 1, wherein the elastic member is glued between the metal member and the lens barrel.

* * * * *